(12) United States Patent
Järvinen et al.

(10) Patent No.: US 9,752,551 B2
(45) Date of Patent: Sep. 5, 2017

(54) ARRANGEMENT FOR A SURFACE AREA ADJUSTMENT OF A RECIPROCATING WING SYSTEM IN A WAVE ENERGY RECOVERY SYSTEM

(75) Inventors: Arvo Järvinen, Vantaa (FI); Rauno Koivusaari, Koria (FI)

(73) Assignee: AW-ENERGY OY, Vantaa (FI)

( * ) Notice: Subject to any disclaimer, the term of this patent is extended or adjusted under 35 U.S.C. 154(b) by 292 days.

(21) Appl. No.: 13/816,279

(22) PCT Filed: Aug. 18, 2010

(86) PCT No.: PCT/FI2010/050653
§ 371 (c)(1),
(2), (4) Date: Mar. 8, 2013

(87) PCT Pub. No.: WO2012/022825
PCT Pub. Date: Feb. 23, 2012

(65) Prior Publication Data
US 2013/0167523 A1    Jul. 4, 2013

(51) Int. Cl.
*F03B 13/12* (2006.01)
*F03B 13/18* (2006.01)
*F03B 13/22* (2006.01)
*F03B 17/06* (2006.01)

(52) U.S. Cl.
CPC ............ *F03B 13/12* (2013.01); *F03B 13/182* (2013.01); *F03B 17/06* (2013.01); *F05B 2240/202* (2013.01); *F05B 2240/313* (2013.01); *F05B 2240/915* (2013.01); *F05B 2250/02* (2013.01); *F05B 2260/50* (2013.01); *F05B 2260/79* (2013.01); *Y02E 10/38* (2013.01)

(58) Field of Classification Search
CPC ..... F03B 13/16–13/1805; F03B 13/181; F03B 13/182; F03B 13/22; F03B 13/26; F03B 13/262; F03B 13/264; F05B 2240/202; F05B 2240/313; F05B 2240/915–2240/9152; Y02E 10/30; Y02E 10/38
USPC ................... 60/495–507; 290/42, 43, 53, 54
See application file for complete search history.

(56) References Cited

U.S. PATENT DOCUMENTS

| 763,623 | A | * | 6/1904 | Nance | 416/8 |
| 3,882,320 | A | * | 5/1975 | Schmeller | F03B 13/264 |
| | | | | | 290/43 |
| 4,170,738 | A | * | 10/1979 | Smith | F03B 13/185 |
| | | | | | 185/30 |

(Continued)

FOREIGN PATENT DOCUMENTS

| WO | WO 2006/100436 A1 | 9/2006 | |
| WO | WO 2007/019608 A1 | 2/2007 | |
| WO | WO 2007125156 A1 * | 11/2007 | ............. F03B 13/18 |

*Primary Examiner* — Laert Dounis
(74) *Attorney, Agent, or Firm* — Birch, Stewart, Kolasch & Birch, LLP (57) ABSTRACT

This invention relates to an arrangement for a surface area adjustment of a reciprocating wing system in a wave energy recovery system where the wave energy recovery system comprises at least a body, a set of wings fastened to a support means that is hinged at its lower ends onto the body to make a reciprocating motion in response to kinetic energy of waves or tidal currents, and a power-take-off means. The arrangement comprises at least adjustment means capable to adjust the total effective surface area of the wings.

14 Claims, 5 Drawing Sheets

(56) References Cited

U.S. PATENT DOCUMENTS

| | | | | |
|---|---|---|---|---|
| 4,371,788 | A * | 2/1983 | Smith, Jr. | 290/42 |
| 5,630,705 | A * | 5/1997 | Eikelenboom | F03D 1/0666 |
| | | | | 416/132 B |
| 6,902,370 | B2 * | 6/2005 | Dawson | F03D 7/0236 |
| | | | | 415/4.1 |
| 8,277,146 | B2 * | 10/2012 | Espedal | 405/75 |
| 2004/0007881 | A1 * | 1/2004 | Kobashikawa et al. | 290/53 |
| 2006/0273595 | A1 * | 12/2006 | Avagliano | F03D 7/028 |
| | | | | 290/44 |
| 2008/0018113 | A1 * | 1/2008 | Tal-or | 290/53 |
| 2008/0191485 | A1 * | 8/2008 | Whittaker et al. | 290/53 |
| 2013/0047601 | A1 * | 2/2013 | Vuorinen | F03B 13/182 |
| | | | | 60/506 |
| 2013/0227942 | A1 * | 9/2013 | Jarvinen | F03B 13/182 |
| | | | | 60/497 |

* cited by examiner

ARRANGEMENT FOR A SURFACE AREA ADJUSTMENT OF A RECIPROCATING WING SYSTEM IN A WAVE ENERGY RECOVERY SYSTEM

The present invention relates to an arrangement for a surface area adjustment of a reciprocating wing system in a wave energy recovery system as defined in the preamble of claim 1.

The adjustment arrangement according to the invention is suited very well for instance to be used in connection with an apparatus having a plate or sail like wing system hinged at its lower edge to make a reciprocating movement caused by wave energy or tidal energy of seawater. The wave energy or tidal energy collected by the apparatus is further converted with a wave energy converter system for instance to electric energy and/or fresh water.

According to the prior art there are various types of wave energy recovery systems where the arrangements include a base and one or more wings of plate type pivotally connected to the base to make a reciprocating or oscillating movement about a rotation axis in response to wave forces or tidal forces. The oscillating movement is then converted for example to electric energy with the help of a generator or alike.

Due to prevailing ocean conditions, which are very much fluctuating, the efficiency of the known wave energy recovery systems have been generally very poor. It has been extremely difficult to adjust the known wave energy recovery systems to collect maximum wave energy both during calm ocean conditions and during stormy ocean conditions and also in different tidal situations. The known wave energy recovery systems have generally not handled well these kinds of extreme conditions and therefore the total efficiency has been so low. One problem is also the fact that the known wave energy recovery systems have produced the converted power unevenly having too high outputs during high wave conditions and too small outputs during calm wave conditions. This has made it difficult to provide a uniform power output suitable for main electric networks.

Another problem has been the adjustment of the height of the wing according to prevailing tidal conditions. The height of the sea level varies often several meters between a low tide and a high tide, and in case the oscillating wing is hinged near the sea bottom it cannot be used optimally in all tidal situations. For example, if the wing reaches from the bottom to the surface during the low tide the upper edge of the wing remains far from the surface during the high tide and a huge portion of the wave energy that could have been collected immediately under the surface is lost. Correspondingly, if the wing reaches from the bottom to the surface during the high tide the upper edge of the wing extends high from the surface during the low tide and is therefore both visually undesirable and also loses its ability to collect the maximum amount of wave energy because of the wind that decreases the collecting power.

A known solution for the adjustment of the height and surface area of the wing according to prevailing wind and tidal conditions is shown in Japanese patent publication No. JP4358769(A). The publication shows an apparatus having a plate like wing that is hinged onto the bottom of the sea and arranged to reciprocate along with the waves. On the upper part of the wing there is a moving part with a float that keeps the upper edge of the moving part always on the surface of the water. When the tide level or wave height changes the float with the moving part moves up and down according to the height of the water surface. Thus, when the water surface is high the float moves up and lengthens the height of the wing enlargening the surface area of the wing, and when the water surface is low the float moves down and shortens the height of the wing thus reducing the surface area of the wing correspondingly. This solution like other similar floating solutions has a disadvantage that it is not suitable for stormy sea conditions, and adjustments or protective arrangements against stormy sea conditions are difficult and costly to make. A further disadvantage of the Japanese solution is that it does neither optimize nor balance the capture according to the prevailing sea conditions.

The object of the present invention is to eliminate the drawbacks described above and to achieve a reliable and efficient arrangement for a surface area adjustment in a wave energy recovery system in order to be able to capture a maximum amount of available wave or tidal energy, and be able to protect the apparatus against stormy ocean conditions. Likewise the object of the present invention is to achieve an arrangement for the wave energy recovery system where the height position of the plate or sail like wing is easily adjustable. The arrangement for a surface area adjustment of a reciprocating wing system in a wave energy recovery system according to the invention is characterized by what is presented in the characterization part of claim 1. Other embodiments of the invention are characterized by what is presented in the other claims.

The solution of the invention has the advantage that thanks to the advanced adjustment arrangement the energy conversion can be maximized because the system is very adaptable to various ocean conditions. Thus the maximum power from the wing motion from the low tide to the high tide and in any kind of ocean condition can be supplied to the power-take-of (PTO) means of the wave energy recovery system. Another advantage is the fact that the total effective surface area of the wing system can be easily adjusted according to the prevailing ocean conditions making it possible to capture the maximum amount of wave energy in any kind of ocean condition. A further advantage is that the adjustment arrangement according to the invention helps to capture more energy in calm conditions when the waves are small. Yet a further advantage is a controlled ability to protect the apparatus against stormy sea conditions. Yet a further advantage is that the wings can be totally under the surface of the water so that no undesirable parts are visible.

In the following, the invention will be described in detail by the aid of three examples by referring to the attached simplified and diagrammatic drawings, wherein.

Figure 1:
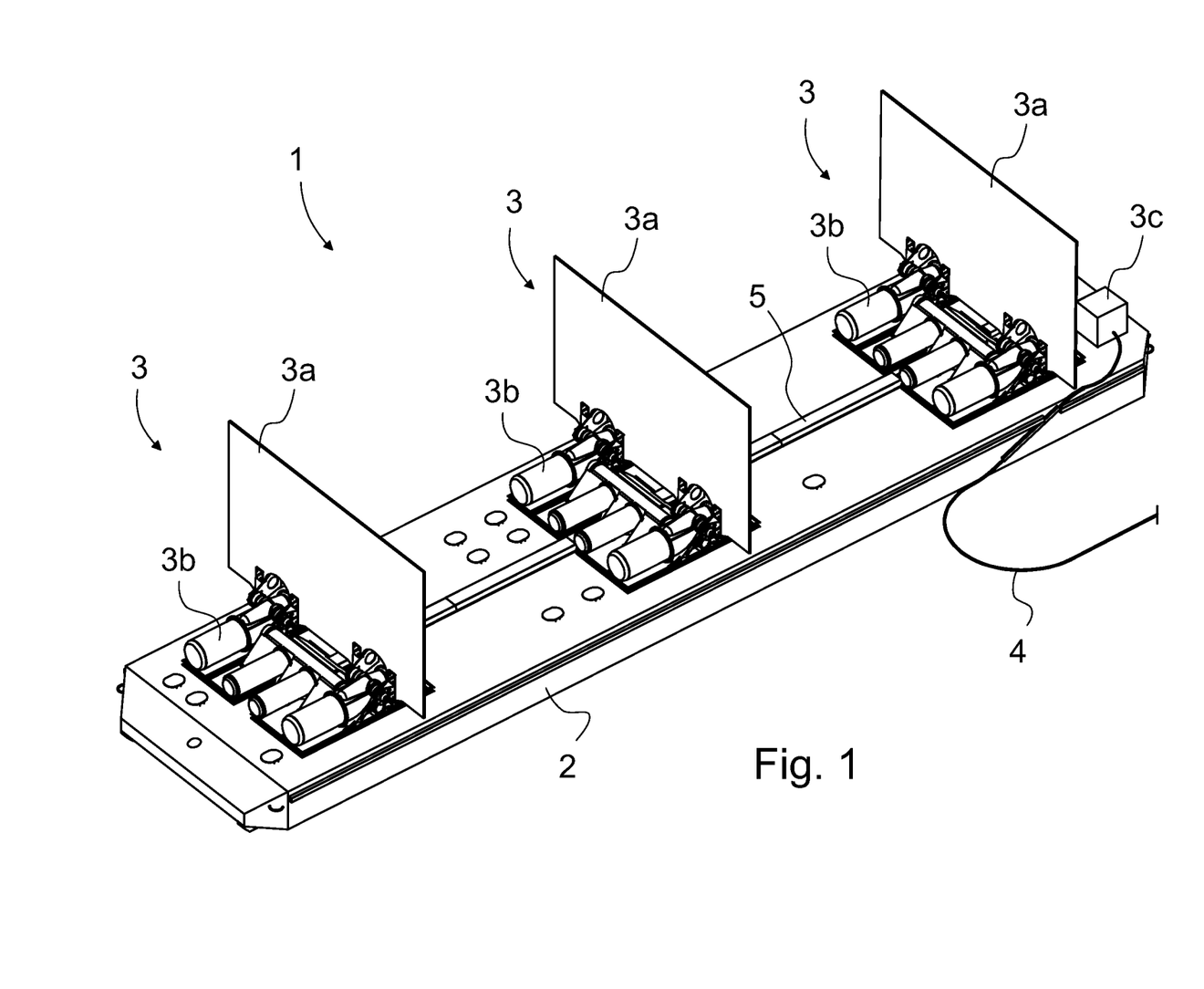
FIG. 1 presents in a top view a wave energy recovery module where the tidal adjustment arrangement of the wave energy recovery system according to the invention can be used.

In FIG. 1 a wave energy recovery module 1 where the tidal adjustment arrangement for the wave energy recovery system according to the invention can be used for recovering kinetic energy like wave energy of seawater or tidal energy of seawater. Since the wave energy recovery system according to the invention is adapted to recover energy carried by the waves/tides of seawater, it can also be referred to as a marine energy recovery system. The wave energy recovery module 1 according to the example of FIG. 1 has been anchored in its production site onto the sea bottom and is situated for example in a so-called intermediate water area of the water basin. The intermediate water area refers here to the same area as in the WO publication No. WO2004097212, i.e. to the water basin area, generally ocean area in the depth range of the so-called breaker-line and shallow waters, extending to the wavelength of 0.5. In the intermediate water area the relation of the water depth to the principally prevailing wavelengths is between ½-1/20. In that water area the depth of the water is generally from about 8 m to 20 m, and the height of the surface of the water caused by the tide can fluctuate several meters. In its production site the wave energy recovery module 1 is capable to recover kinetic energy of the waves of the sea and convert the kinetic energy into electric energy. Likewise the wave energy recovery module 1 is capable to make fresh water from the seawater.

The wave energy recovery module 1 comprises at least a body 2 that functions as a base, one or more onto the body 2 attached recovery units 3 for recovering wave energy, collecting means 3c for collecting the energy recovered by the recovery units 3, a cable 4 for transferring the collected energy to further use, and a cable trough 5 equipped with a protective cover for joining all the recovery units 3 of the wave energy recovery module 1 at least into the collecting means 3c.

The body 2 is made for instance of concrete or steel and consists of a group of floating compartments, instrument and machinery chambers that are kept dry, and valve compartments at both ends of the body 2. In the valve compartments there are filling and discharge valves for air and filling and discharge valves for water. Water pipes and air pipes has been installed to go through the separation walls of the compartments in order to allow water and air to run into all the floating compartments and valve compartments. Thanks to its heavy concrete or steel structure the wave energy recovery module 1 remains steady on the sea bottom when the floating compartments are filled with water. Correspondingly floating compartments are big enough to allow the body 2 to float on the surface of the water when the floating compartments are filled with air.

Each recovery unit 3 comprises at least a plate like or sail like wing element 3a that is hinged onto the body 2 of the wave energy recovery module 1, and the recovering means or the power-take-of (PTO) means 3b of the wave energy.

The wing element 3a is arranged to make reciprocating motion caused by the kinetic energy of the waves, and the recovered energy is either saved into the energy storages situated in the body 2 or transferred through the collecting means 3c and cable 4 to the use of the next unit that can be for instance a collecting station situated on shore. The fresh water produced by the wave energy recovery module 1 can be stored in containers situated in the body 2 of the wave energy recovery module 1, and delivered time to time for further use.

Figure 2:
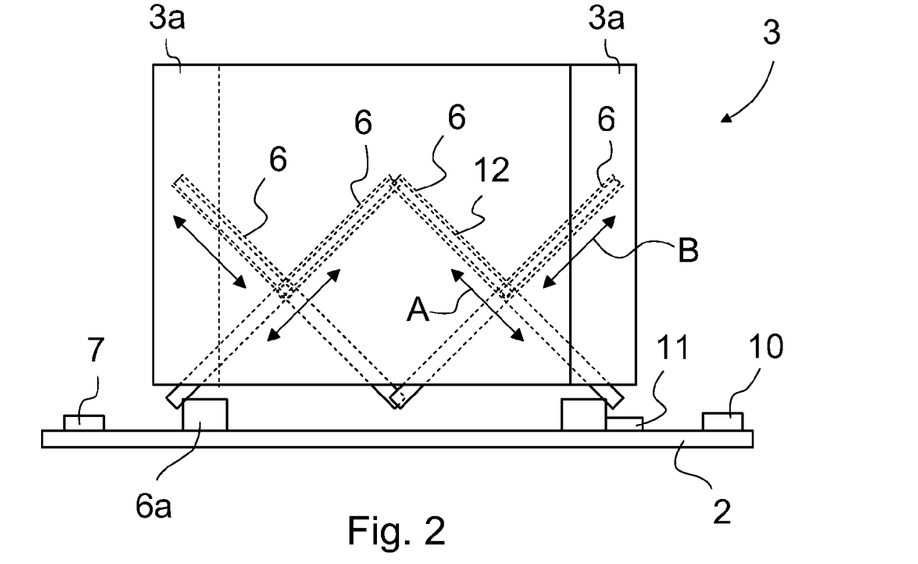
FIG. 2 presents in a front view and in a simplified and diagrammatic way a plate like wing assembly according to the invention in its lowermost and smallest position.
Figure 3:
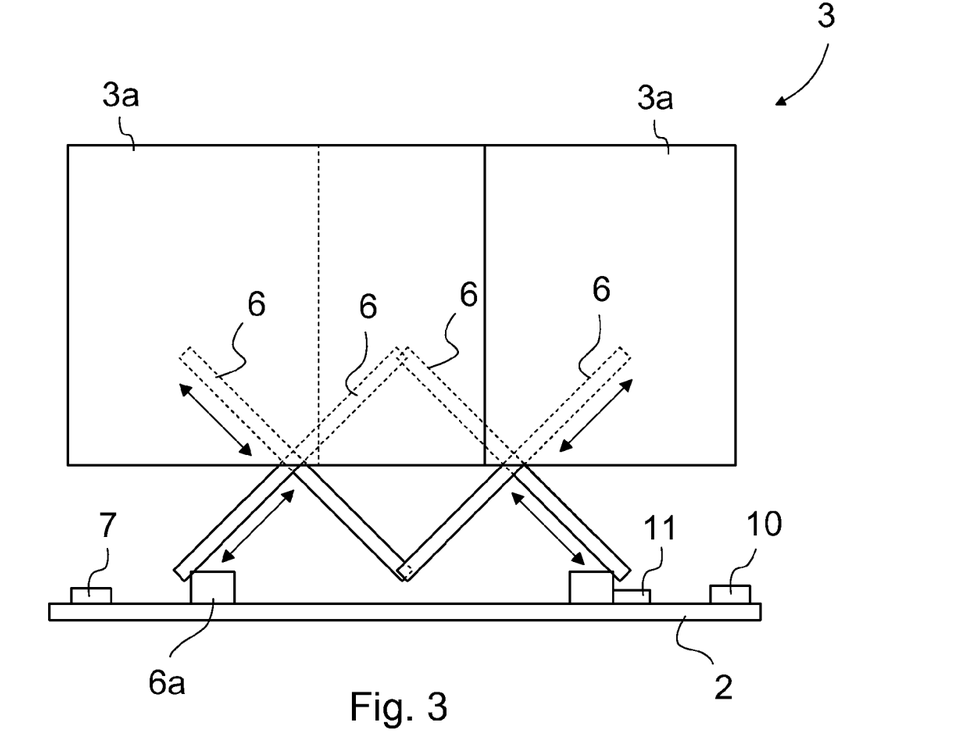
FIG. 3 presents in a front view and in a simplified and diagrammatic way a plate like wing according to the invention in its intermediate size and position.
Figure 4:
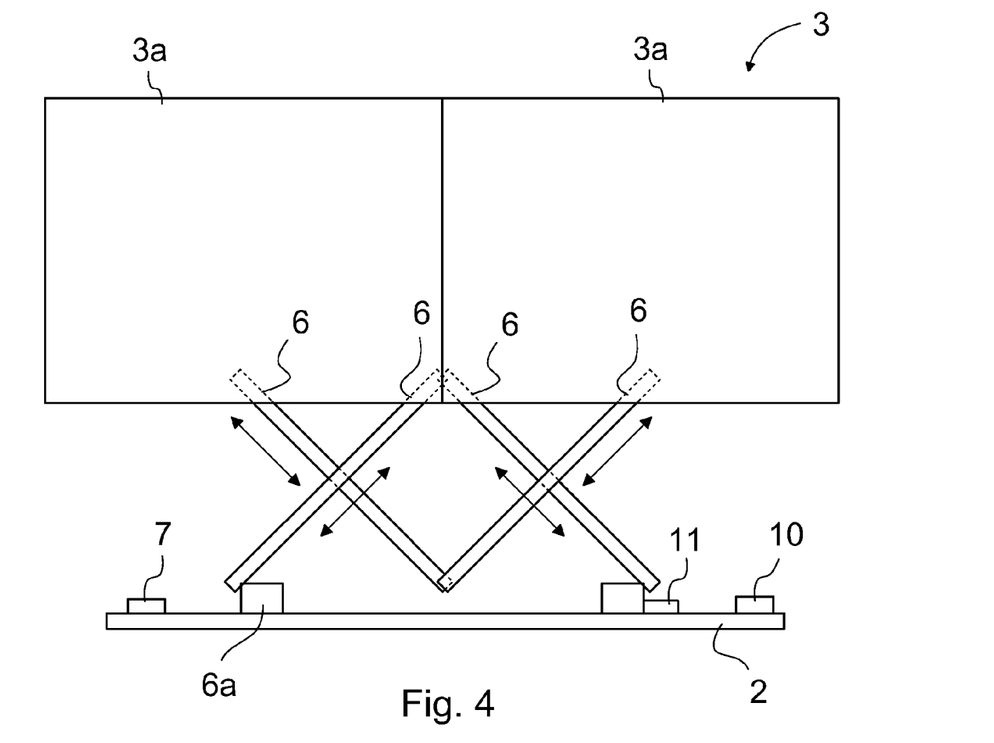
FIG. 4 presents in a front view and in a simplified and diagrammatic way a plate like wing according to the invention in its uppermost and largest position.

In FIGS. 2-4 a recovery unit 3 comprising two plate like wings 3a according to the invention is shown in a simplified and diagrammatic way at its different positions. In FIG. 2 the wings 3a according to the invention are shown at their lowermost position. The first or leftmost wing 3a is in front and the second or rightmost wing 3a is behind the first wing when seeing from the viewer's direction. The total effective surface area of the wings 3a is at its minimum. Correspondingly in FIG. 3 both the wings 3a are at their intermediate position and are elevated upwards and at the same time sidewards from their lowermost position. The total effective surface area of the wings 3a has increased compared to the lowermost position. And in FIG. 4 the wings 3a are at their uppermost position and are elevated further upwards and at the same time sidewards from their intermediate position, and at the same the total effective surface area of the wings 3a has increased to its maximum size. The term wing 3a includes also a means 6 to support the wings and to connect the wings 3a onto the body 2 of the wave energy recovery module 1 with hinges 6a at the lower ends of the support means 6 so that the wings 3a are pivoted onto the body 2 at their lower edge or near to their lower edge via the support means 6 to make a reciprocating motion in response to kinetic energy of waves or tidal currents. The support means 6 comprises further an adjustment means 12 to adjust the vertical and/or horizontal position of the wings 3a and at the same time to adjust the total effective surface area of the set of wings 3a.

The body 2 onto which the support means 6 of the wings 3a is hinged with hinge means 6a is shown also in a simplified and diagrammatic way. The wings 3a are fastened to the support means 6 individually so that they can be moved separately by the adjustment means 12 in a slant direction. The first wing 3a is moved between its lowermost position and uppermost position in the first slant direction shown by the arrow A in FIG. 2, and the second wing 3a is moved between its lowermost position and uppermost position in the second slant direction shown by the arrow B in FIG. 2.

The slant movement of the wings 3a is implemented with the adjustment means 12 that can be extended in a slant direction. The adjustment means 12 includes for instance hydraulic cylinders with two, three or more extendable cylinder parts. It is also possible that the adjustment means 12 is in vertical position and guiding elements are in slant directions shown by the arrows A and B. When the wings 3a are elevated upwards they move at the same time along the guiding elements in the slant directions A and B. The angle of the slant directions A and B is suitably 45° but it can also be some other angle.

This type of the recovery unit 3 is very versatile. During the low tide both the wings 3a are always lowered to their lowermost position as shown in FIG. 2. Correspondingly, during the high tide when the prevailing ocean conditions are normal both the wings 3a are elevated to their uppermost position in order to capture as much wave energy as possible. Whereas the prevailing ocean conditions are calm both the wings 3a are elevated to their uppermost position in order to cause as minimal as possible drag of water near the sea bottom where the water is not moving in the same phase than closer to the surface. And finally, when the prevailing ocean conditions are stormy the wings 3a are lowered downwards to the safe position and size to stand the heavy conditions.

Figure 5:
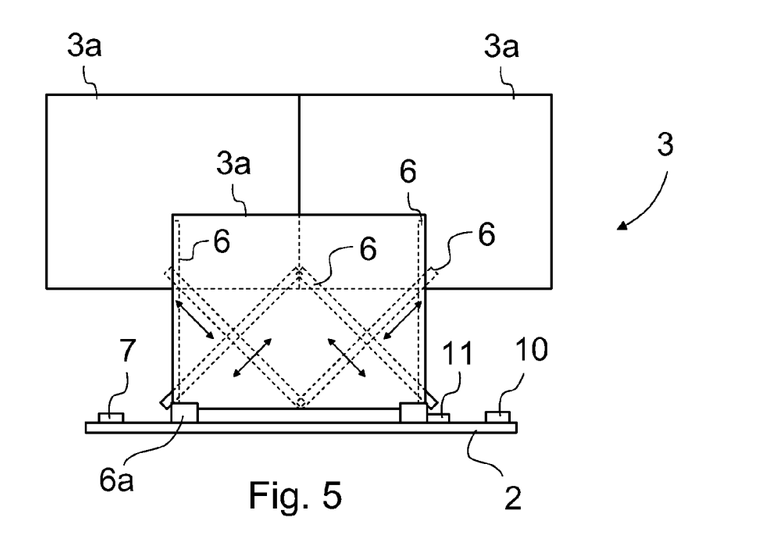
FIG. 5 presents in a front view and in a simplified and diagrammatic way another plate like wing according to the invention in its largest size.

In FIG. 5 another recovery unit 3 comprising three plate like wings 3a according to the invention is shown in a simplified and diagrammatic way in its maximum position. Then two of the three wings 3a are in their uppermost position and with the maximum total effective surface area, and the third wing 3a is lower in the middle near the body 2. The two upper wings 3a in FIG. 5 have essentially similar structure with the support means 6 and adjustment means 12 as the wings 3a shown in FIGS. 2-4, and they can be moved up and down in the slant directions A and B. Thus in the minimum position all the three wings 3a are down essentially at the same location and adjacent to each other so that the total effective surface area is at its minimum, about the size of only one wing 3a.

The third wing 3a includes an essentially vertical support means 6 to support the wing 3a and to connect the wing 3 onto the body 2 of the wave energy recovery module 1 with hinges 6a at the lower ends of the support means 6 so that the wing 3a is pivoted onto the body 2 at its lower edge or near to its lower edge via the support means 6 to make a reciprocating motion in response to kinetic energy of waves or tidal currents. The support means 6 comprises further an adjustment means 12 to control the vertical position of the third wing 3a in order to adjust the total effective surface area of the set of wings 3a. The lowermost middle wing 3a can be used for instance to protect the recovery unit 3 against too stormy conditions by lowering it into its lowermost position. By moving the two uppermost wings 3a suitably in a vertical direction the maximum power from the wing motion from the low tide to the high tide and in any kind of ocean condition can be captured.

A gap between the lower edge of the third wing 3a and the body 2 can be adjusted by the adjustment means 12 so that when the gap is closed no flow through the gap occurs, or when the gap is small only a small flow compared to the total flow of water can occur. By the help of the adjustment means 12 the gap can be closed and the gap can be enlarged or decreased in a controlled way. The structure of the third wing 3a can also be such that the vertical adjustment of the third wing 3a is not available. In that case the structure is less complicated but a possibility for adjusting is missing.

Figures 6, 7, 8:
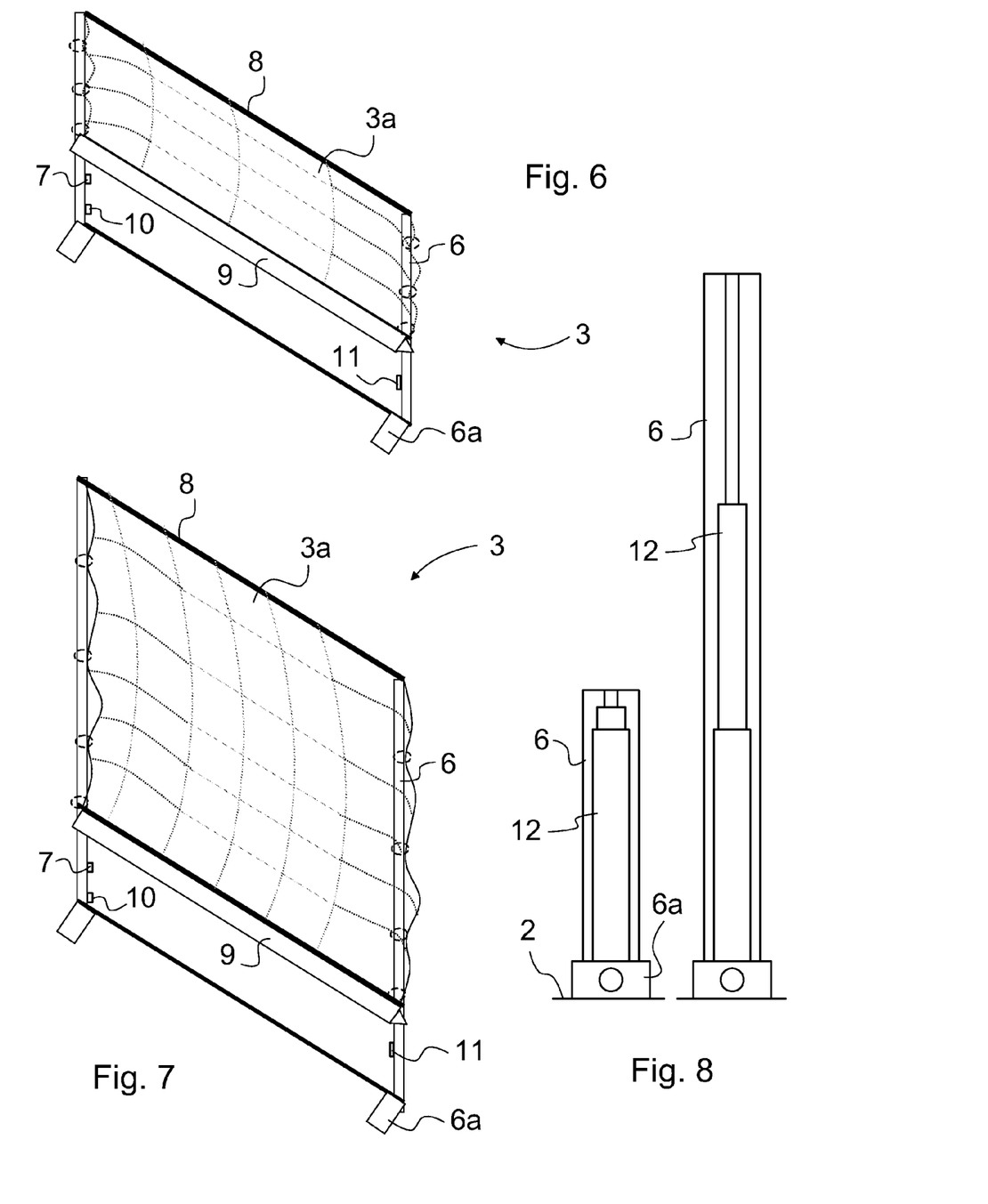
FIG. 6 presents in a top view and in a simplified and diagrammatic way a sail like wing according to the invention in its lowermost position.
FIG. 7 presents in a top view and in a simplified and diagrammatic way a sail like wing according to the invention in its uppermost position.
FIG. 8 presents in a front view and in a simplified and diagrammatic way yet another plate like wing according to the invention in its largest size.

In FIGS. 6 and 7 yet another recovery unit 3 comprising a sail like wing 3a according to the invention is shown in a simplified and diagrammatic way in its lowermost and uppermost positions. In FIG. 6 the wing 3a is in its lowermost position and in FIG. 7 the wing 3a is in its uppermost position. The body 2 onto which a pair of the support means 6 of the wings 3a is hinged with a pair of hinge means 6a is not shown in the figures. The wing 3a is fastened to the support means 6 so that its upper edge 8 can be moved up and down in a vertical direction. The vertical movement of the upper edge 8 of the wing 3a is implemented with the support means 6 that can be extended in a vertical direction. The support means 6 include for example hydraulic cylinders with two, three or more extendable cylinder parts.

The lower edge of the sail like wing 3a is rolled in a roll arranged in the horizontal casing 9 that is stationary fastened to both of the support means 6. The height adjustment is implemented with the support means 6 by extending the upper ends of the support means upwards and at the same time elevating the upper edge 8 of the wing 3a upwards to a needed level of height. The corresponding amount of sailcloth unwinds from the roll during the elevation. When the upper edge 8 is lowered, the corresponding amount of sailcloth rewinds to the roll in the casing 9.

In FIG. 8 the support means 6 including the adjustment means 12 acting as a size and height adjusting means of the wing 3a according to the invention is shown in its lowermost and uppermost position. The support means 6 is hinged at its lower ends with the hinges 6a onto the body 2 of the wave energy recovery module 1.

In this example the support means 6 includes a hydraulic cylinder as an adjustment means 12 but the adjustment means 12 or the actuating means can be also other kind of actuator, for instance a rack and pinion system or a linear actuator or alike. The support means 6 can be vertical or situated in a slant position.

Figure 9:
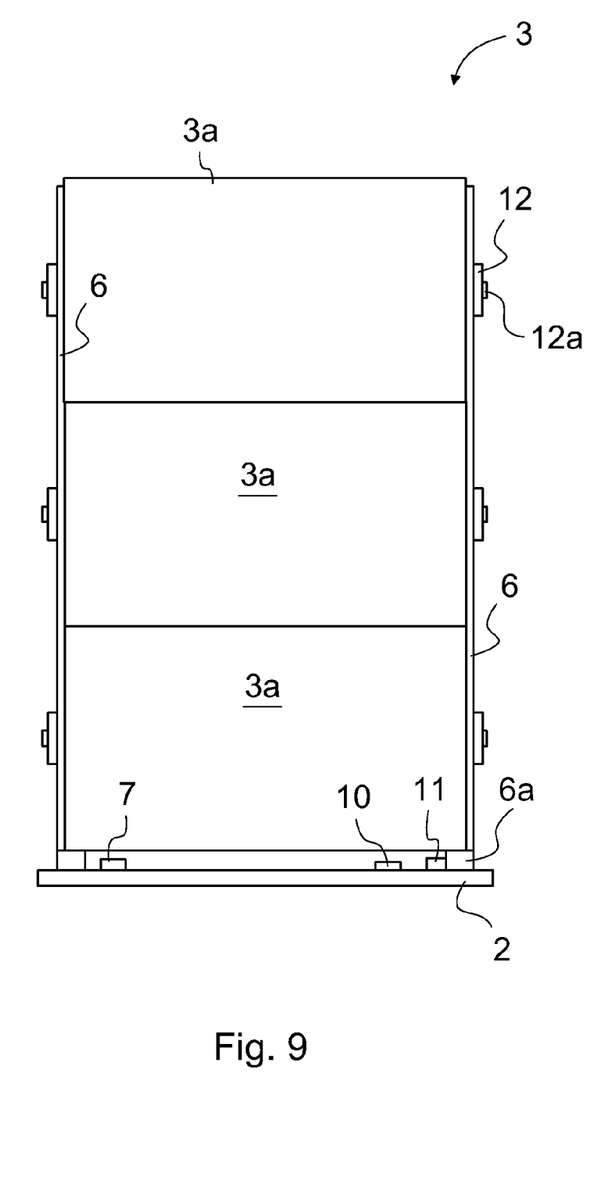
FIG. 9 presents in a side view and in a simplified and diagrammatic way the plate like wing according FIG. 8 reduced in its size and FIG. 10 presents in a side view and in a simplified and diagrammatic way a height adjusting means of the wing according to the invention in its lowermost and uppermost positions.
Figure 10:
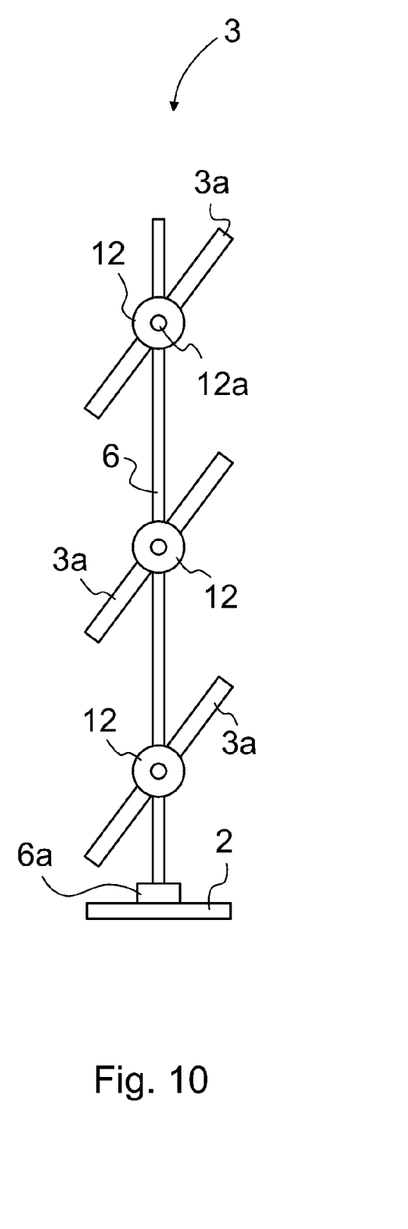

In FIGS. 9 and 10 yet a further recovery unit 3 comprising three plate like wing that are situated one upon the other is shown in a simplified and diagrammatic way. The wings 3a are hinged onto the pivot shafts 12a at the middle of their side ends to the vertical support means 6 that is further hinged at its lower end onto the body 2 of the wave energy recovery module 1. Thus all the wings 3a reciprocate with the support means 6 in response to kinetic energy of waves and/or tidal currents. The wings 3a can be adjusted by rotating them around their horizontal pivot shafts 12a as is shown in FIG. 10. By rotating the wings 3a from a vertical position towards the horizontal position the total effective surface area of the wings 3a is reduced in order to adjust the energy capturing. The arrangement comprises adjustment means 12 connected to the control system of the wave energy recovery system for rotating the wings 3a either all together or individually around the shafts 12a according to instructions given by the control system of the wave energy recovery system.

The elevation, position and the total effective surface area of the wings 3a can be controlled and adjusted in various ways. For that purpose the arrangement for a wave energy recovery system according to the invention comprises for instance a detector means 11 to recognize the prevailing ocean conditions. The detector means 11 is connected to the control system of the wave energy recovery system and arranged to give information to maximize the capture of energy and to protect the apparatus against stormy ocean conditions by adjusting the total effective surface area of the wings 3a and by positioning the wings 3a to the height that is as optimal as possible to the prevailing ocean conditions. Thus for instance the detector means 11 is arranged to give the information to lower the wing 3a nearer to the sea bottom and/or reduce the total effective surface area of the wings 3a in stormy sea conditions, and to give the information to elevate the wing 3a nearer to the surface of the water and/or increase the total effective surface area of the wings 3a in order to maximize the capture of the wave energy in calm sea conditions.

As to the tidal adjustment one way is to use public tide tables that include accurate enough predictions to give an easy and reliable way of controlling the height position of the wing 3a corresponding to the surface of water. The data of the tide tables is entered to the computer database of the wave energy recovery module 1 and it can be used continuously to control the height position of the wing 3a. Another way to control the tidal adjustment is to use a pressure sensor 7 or alike to measure the current height of the water surface. These two ways can be used also together. When the plate like wing 3a or the upper edge 8 of the sail like wing 3a is moved upwards or downwards the height position can be adjusted steplessly between the uppermost height position and the lowermost height position and also the total effective surface area of the wings 3a can be adjusted steplessly.

A common feature to all the ways to control the movement of the wings 3a is a movement control means 10 of the wave energy recovery module 1 by which the adjustment of the wings 3a is done. The movement control means 10 is connected to the control system of the wave energy recovery system and monitors at least the total effective surface area of the wings 3a keeping the surface area as optimal as possible in all situations. In the embodiment shown in FIGS. 9 and 10 the movement control means 10 controls the rotating movement of the wings 3a that affects the size of the total effective surface area of the wings 3a.

It is obvious to the person skilled in the art that the invention is not restricted to the example described above but that it may be varied within the scope of the claims presented below. Thus, for example, the structure of the wave energy recovery unit with the wings can vary.

It is also obvious to the person skilled in the art that the height and size adjustment arrangement of the wings can be mechanical or electrical and can be based automatically on either movement, speed or position of the wings, or the height and size adjustment can be based on a controlled programming.

The invention claimed is:

1. A marine energy recovery system comprising:
   a body; and
   a set of wings each fastened to support bars, which have respective ends that are hinged onto the body so as to form a rotation axis, in such manner as to make a reciprocating motion in response to kinetic energy of waves of seawater or tidal currents, the marine energy recovery system being configured to convert the reciprocating motion into electric energy,
   wherein each wing is in front of or behind another wing in the set of wings,
   wherein each of the support bars has an unhinged end,
   wherein first support bars, which are attached to one of the set of wings, have unhinged ends that are controllable to extend and retract in a direction, and wherein second support bars, which are attached to an adjacent wing, have unhinged ends that are simultaneously controllable to extend and retract in a different, non-parallel direction relative to the first support bars, in order to adjust the total effective surface area of the wings, the extension and retraction of the unhinged ends of the first and second support bars being implemented using at least one of: a hydraulic cylinder, a rack and pinion system, and a linear actuator.

2. The marine energy recovery system according to claim 1, further comprising a controller that controls the change of the total effective surface area and/or the vertical position of the wings by controlling the simultaneous extension/retraction of the unhinged ends of the respective first and second support bars.

3. The marine energy recovery system according to claim 2, further comprising a detector that detects the prevailing ocean conditions, and is connected to the controller of the wave energy recovery system and arranged to give information to maximize the capture of energy by adjusting the total effective surface area of the wings according to the prevailing ocean conditions.

4. The marine energy recovery system according to claim 3, wherein in stormy sea conditions the detector is arranged to give the information so as to reduce the total effective surface area of the wings and/or to lower the wings nearer to the sea bottom in relation of the strength of the sea conditions.

5. The marine energy recovery system according to claim 3, wherein the detector is arranged to give an order to the controller to increase the total effective surface area of the wings and/or to elevate the wing nearer to the surface of the water in order to maximize the capture of the wave energy in calm sea conditions.

6. The marine energy recovery system according to claim 1, wherein the set of wings includes at least two wings whose vertical and/or horizontal position is adjustable.

7. The marine energy recovery system according to claim 1, wherein the set of wings includes three wings of which the position of the first two wings is adjustable vertically and horizontally and the position of the third wing is adjustable vertically.

8. The marine energy recovery system according to claim 1, wherein the support bars are extendable either in a vertical or in a slant direction.

9. The marine energy recovery system according to claim 1, wherein the first and second wings are arranged to rotate around respective horizontal pivot shafts to which the wings are hinged.

10. The marine energy recovery system according to claim 2, wherein the controller is arranged to use data of available tide tables or the data of pressure sensor to determine a current height of the water surface.

11. The marine energy recovery system according to claim 1, wherein:
   a height and size adjustment of the wings is performed mechanically or electrically, and
   the height and size adjustment is performed either:
      automatically based on either movement, speed or position of the wings, or
      based on a controlled programming.

12. The marine energy recovery system according to claim 2, wherein in stormy sea conditions a detector is arranged to give the information to reduce the total effective surface area of the wings and/or to lower the wings nearer to the sea bottom in relation of the strength of the sea conditions.

13. The marine energy recovery system according to claim 4, wherein the detector is arranged to give an order to the controller to increase the total effective surface area of the wings and/or to elevate the wing nearer to the surface of the water in order to maximize the capture of the wave energy in calm sea conditions.

14. The marine energy recovery system according to claim 2, wherein the set of wings includes at least two wings whose vertical and/or horizontal position is adjustable.

* * * * *